No. 775,851. PATENTED NOV. 22, 1904.
F. R. PACKHAM.
DISTRIBUTER FOR GRAIN DRILLS.
APPLICATION FILED APR. 6, 1904.
NO MODEL. 2 SHEETS—SHEET 1.
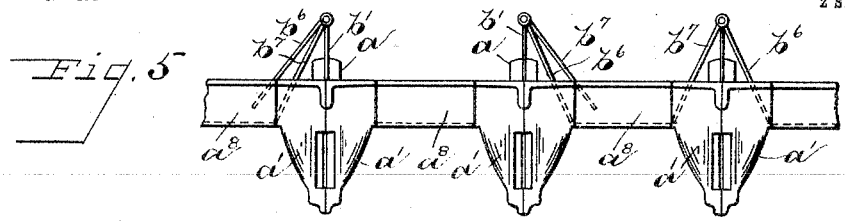
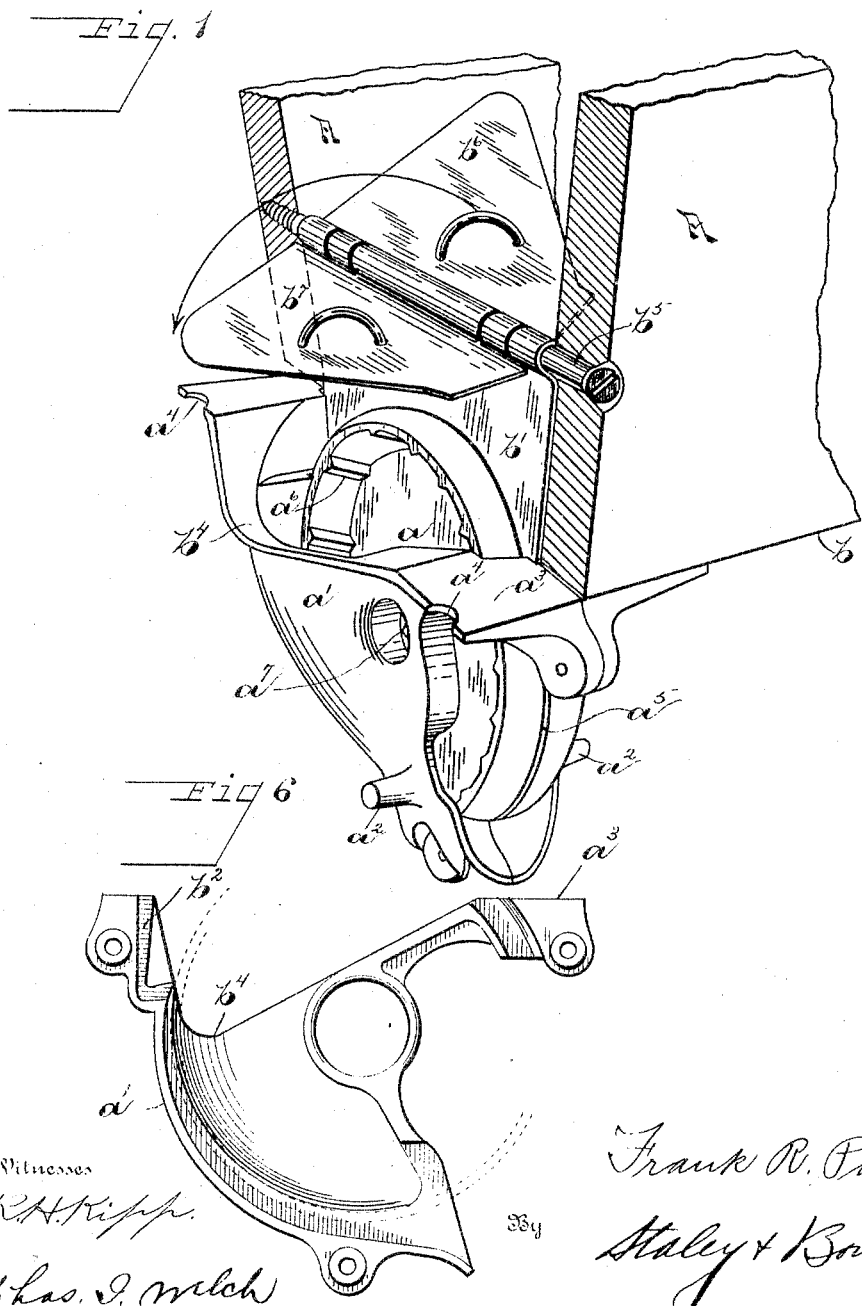

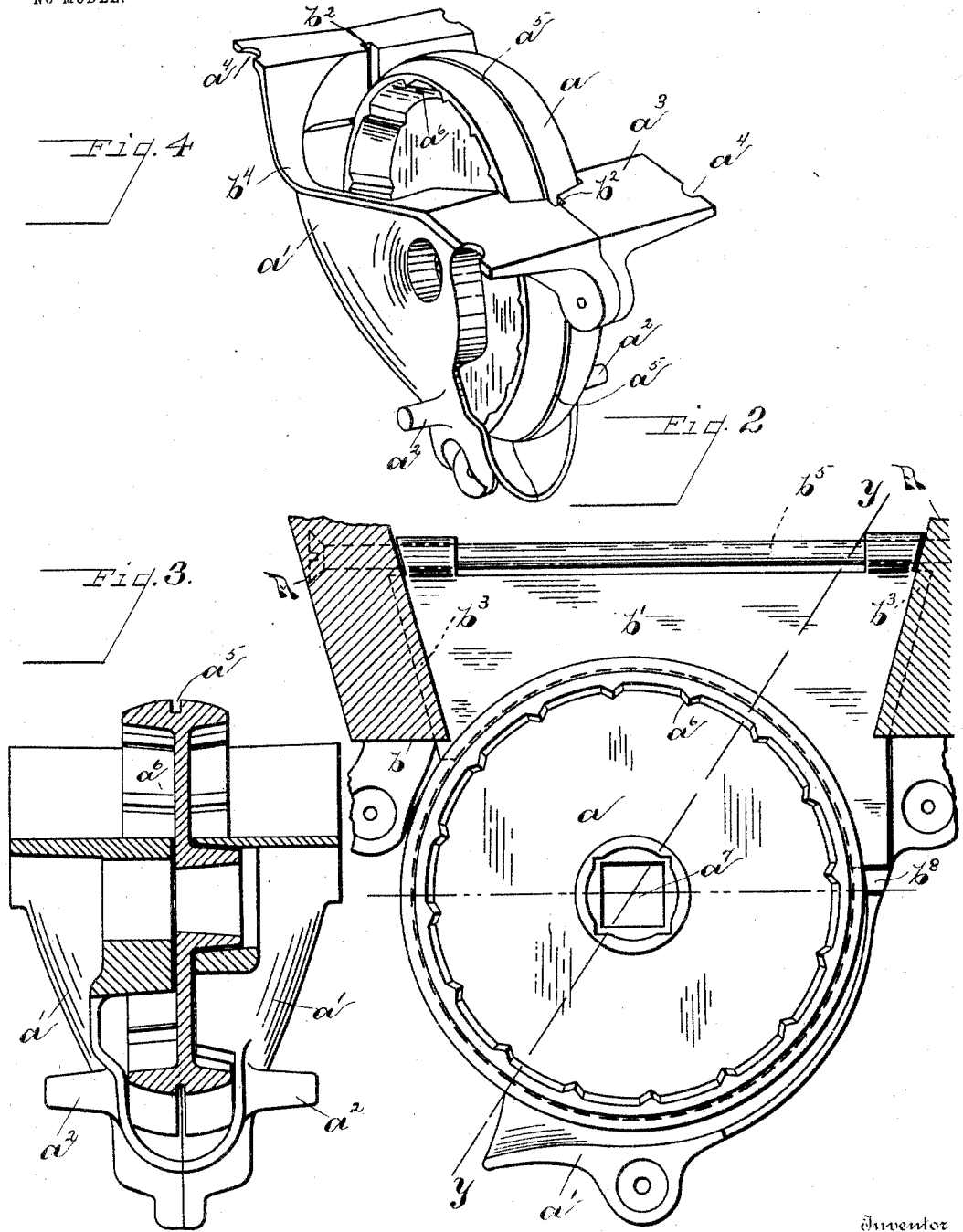

No. 775,851. Patented November 22, 1904.

UNITED STATES PATENT OFFICE.

FRANK R. PACKHAM, OF SPRINGFIELD, OHIO, ASSIGNOR TO AMERICAN SEEDING MACHINE COMPANY, OF JERSEY CITY, NEW JERSEY, A CORPORATION OF NEW JERSEY.

DISTRIBUTER FOR GRAIN-DRILLS.

SPECIFICATION forming part of Letters Patent No. 775,851, dated November 22, 1904.

Application filed April 6, 1904. Serial No. 201,795. (No model.)

*To all whom it may concern:*

Be it known that I, FRANK R. PACKHAM, a citizen of the United States, residing at Springfield, in the county of Clark and State of Ohio, have invented certain new and useful Improvements in Distributers for Grain-Drills, of which the following is a specification.

My invention relates to improvements in grain-drill feeding devices, often called "distributers."

It relates more particularly to a force-feeding device and is of the type known as "flange" feeds.

My object is to construct a feeding device simple in construction and accurate in the feeding of grain of different varieties and sizes, one that is free from leakage, which so often results in some grain being fed improperly and some failing to reach the spout or conduit. A further advantage is shown in connection with the use of the double-run feed, and I provide means for closing the openings in one or both of the measuring-channels of the feeding device and adapted, further, to cut off entirely the flow of grain to both channels simultaneously for the purpose of throwing out of operation any distributer of the series.

In the drawings, Figure 1 is a perspective view of one feeding device attached to the hopper of the machine. Fig. 2 is a vertical sectional view of the feeding device and accompanying parts, taken through the center thereof. Fig. 3 is a transverse view taken on the line *y y* of Fig. 2. Fig. 4 is a view in perspective of the casing and wheel. Fig. 5 is a rear elevation view of the distributers shown in series. Fig. 6 is a detail of the casing.
Like parts are indicated by like characters of reference in the several views.

It will be understood that in a wheat-drill or other machine to which my distributer is to be attached the hopper of the machine is supported by the carrying-wheels, and the force required to move the wheels of the feeding devices is transmitted through gearing from said carrying-wheels to said feeding-wheels. It is usual to employ a series of distributers for each machine, and it is usual to have what has been called the "double-run" feature, and by this is meant a distributer having two feeding-flanges and channels for same, and these flanges and channels are formed differently, so that each is adapted to sow a different variety of grain. One flange and channel is usually formed for small hard and smooth grains—such as wheat, rye, hemp, or flax seed—while the other flange and channel is formed for oats, barley, buckwheat, maize, and seeds of the coarser or chaffy variety.

One great difficulty often encountered in distributers of this class is that oats, barley, and seeds of the coarser or chaffy variety frequently form arches or so-called "bridges" above what is known as the "measuring-channel," thereby retarding the gradual and necessary even flow of the grain to said measuring-channel. My improved device is designed to prevent this, as will be more fully explained. Another difficulty frequently met with in double-run feeding devices is that fine seeds, such as flax, escape across the distributer from one side of the feeding-wheel into the wrong measuring-channel, it being remembered that no one measuring-channel is adapted to sow both kinds of grain. Whenever the hard smooth grains, such as wheat, &c., are to be sown, it is desirable to shut off the measuring-channel for sowing the coarse chaffy variety of grains, and my improvement consists in an improved form of device for cutting off one of the measuring-channels in such manner that there is no possibility of the grain escaping into the measuring-channel for the other kind of grain. In accomplishing all these objects it is especially desirable to have a flange feeding device which will positively and accurately feed the grain which passes within the measuring-channel of the distributer. By the constructions shown I improve the accuracy and efficiency of this flange feeding device.

The side frames of the hopper are indicated by A.

The wheel of the feeding device is indicated by $a$. It is formed of such width as to extend within both measuring-channels, as will be more fully explained.

The outer casing of the distributer is indicated by $a'$, and I have shown the wheel $a$ surrounded by two casings, each being indicated by $a'$. The space formed between the wheel $a$ and the casing $a'$ is called the "measuring-channel," and the measuring-channels are of different formations, depending on what variety of seed it is desired to sow. By reason of the fact that in machines of this class each feeding-wheel is usually adapted to sow both hard grains and coarse and chaffy grains the measuring-channel on one side of the wheel is particularly adapted for the feeding of hard grains, while the measuring-channel on the opposite side of the wheel is formed particularly for the other variety of grain. In these devices the grain is carried by the inside flange of the carrying-wheel through a restricted opening to the point of discharge, from which point the seed drops, by gravity, into a spout or other connection which carries the seed to the ground, where it is delivered by the furrow-opener. The amount sown is determined by the speed of the wheel, and in these machines there are change-of-speed devices. The spouts are not shown, but may be connected to the lower rear end of the feeding device at the points $a^2$, Fig. 1.

I have shown the casing $a'$ of the feeding device formed at each upper end with a flat surface, (indicated by $a^3$.) These two casings for each feeding-wheel $a$ are adapted to be held together, as indicated in Fig. 4. The flat surface $a^3$ is formed to fit against the bottom of the feed-hopper, (see Fig. 1,) and the perforations $a^4$ in the casing are for the fastening device which holds the casings rigid to the bottom of the hopper. The outer rim of the feeding-wheel $a$ is formed with a groove $a^5$, (shown in Fig. 4,) the purpose of which will be explained hereinafter. The inside flange of the wheel $a$, (indicated by $a^6$,) is formed with ribs, (see Figs. 1 and 4,) and these ribs are particularly adapted to assist in carrying the seed through the discharge-opening of predetermined size formed between the casing $a'$ and the face of the feed-wheel, which discharge-opening is located at the lower end of the casing near the point of attachment for the spouts. (See Fig. 1.) The axis of the feeding-wheel is indicated by $a^7$, Fig. 1, and it usually consists of a shaft which extends across the machine, the feeding-wheels being rigidly journaled to the shaft and the motion from the driving-wheels being transmitted to the feeding-wheels through this shaft.

The bottom of the hopper is indicated by the letter $b$.

The partition-plate which separates the hopper immediately above the feeding device into two compartments is indicated by $b'$. Heretofore the face of the feeding-wheel and the partition-plate were so arranged as to provide an irregular and unreliable closing of the space above the feed-wheel. I have overcome this by a partition-plate of peculiar formation, as shown in Fig. 1, so that the lower edge of the plate is adapted to fit within the groove $a^5$, formed within the feeding-wheel $a$. I have shown in Fig. 4 the two casings $a'$, adapted when assembled to form a groove $b^2$, within which said partition-plate at its lower extremity fits, while at its upper extremity it also fits within a groove $b^3$, formed in the sides of the hopper. Consequently the partition-plate is adapted to fit so compactly that there cannot be any possibility of the fine grain leaking through from one compartment of the hopper into the adjoining compartment. The sides of the outer casing $a'$ are of peculiar configuration, and for the purpose of improving the efficiency of the feeding device I have cut away the upper part of the casing, as shown at $b^4$, Fig. 4. Usually this casing is formed so that the sides extend up even with the bottom of the hopper; but by the construction shown in Figs. 1 and 4 the sides of the casing at the upper ends are broken away. The intervening space between the grain-distributer is closed by a suitable extended portion $a^8$ of the main hopper or seedbox, preferably in the form of a metallic spacer, as shown in Fig. 5, and by reason of the part of the sides of the casing broken away at $b^4$ there is exposed a greater area of moving surface of the feed-wheel $a$ to the grain, which provides more efficient means for undermining the grain above the wheel and preventing the tendency of the grain to "bridge" over the measuring-channel through which the grain is to be sown.

Through the sides of the hopper I pass the pivot-rod $b^5$, which extends through an opening formed in upper edge of the partition-plate $b'$, securely supporting said partition-plate in proper position. I also pivot about said rod $b^5$ two plates $b^6$ and $b^7$. These are known as "reversing-plates," having heretofore been used in grain-distributers, and I recognize the fact that it is not new to pivot these plates; but the novelty consists in the manner in which I construct these plates and the relative position of the plates to the feed-wheel, enabling me to derive an entirely new advantage from the combination.

The pivot-rod $b^5$, as will be observed from Fig. 1, is located at a point well up into the hopper, and consequently, the plates being pivoted from that point, either plate may be oscillated until it is thrown from one compartment into the opposite compartment, where it will rest upon the back of the opposite plate, as indicated in Fig. 5, and will assist to guide the grain to the adjoining distributer. In this figure I have shown at the left the right-hand plate reversed into the left-hand compartment resting above the left-hand plate, which will cause the grain above said plate to be guided toward the distributer to the left, whereas in the center of the figure I have shown a distributer where the left-hand plate is thrown over into the right-hand compartment and rests above the right-hand plate, while at the right side of the figure I have shown both plates in normal position, adapted simultaneously to cut off the grain from both measuring-channels.

It is evident that there can be but one proper point for the location of the pivotal rod $b^5$, upon which the reversing-plates $b^6$ and $b^7$ are hinged—namely, that point from which the reversing-plates $b^6$ and $b^7$ are swung as a center—so that either plate when dropped into its normal position of contact with the casing at the point $b^4$ will clear the edge of the flange of the feed-wheel $a$ and yet will when thrown back over its opposite plate, as shown on the right-hand and center distributers, Fig. 5, have sufficient incline to deflect the grain resting upon it toward the next distributer.

In order to insure that very small grain which may leak between the flanges of the feed-wheel and outer casing shall not be lost, but shall be conveyed into the regular conduit for carrying the grain from the distributer to the furrow-opener, I have shown the casing closed around the feed-wheel at the bottom and rear, practically touching in the back at the point $b^8$ and tapering away gradually from that point to the regular point of discharge into the conduit, so that the grain leakage from the flange of the feed-wheel, as above described, shall be carried by gravity and the friction of the feed-wheel out of the casing through the point of discharge for the regularly-distributed grain.

Having thus described my invention, I claim—

1. The combination of hopper and feeding device consisting of a casing and wheel having a groove formed in its outer face, and a partition adapted to fit within said groove, for the purpose specified.

2. The combination of hopper and feeding device consisting of casing and wheel, a groove formed in the outer periphery of said wheel, and a partition-plate supported within said groove with the periphery of said wheel at each side of said groove exposed within said hopper.

3. The combination of hopper and feeding devices consisting of a casing and feeding-flange, the ends of said casing being formed to fit the ends of said hopper, the sides of said casing being dropped below the ends of same forming an open space between said hopper and the side of said casing, an extension to said hopper forming with said casing a chamber alongside said feeding-flange.

4. The combination of hopper and a series of feeding devices, each feeding device consisting of a casing and feeding-flange, the ends of said casing formed flush with the bottom of said hopper, and the sides of said casing ending below the ends of said casing and forming an open space between the bottom of the hopper and the casing, extensions formed to said hopper, said extensions forming with the casings a series of chambers, each chamber being located alongside a feeding-flange, for the purpose specified.

5. The combination of hopper and feeding device consisting of a casing and moving flange, said casing and flange forming a double-run device, a plurality of reversing-plates and pivots for said plates whereby each plate may swing into normal position clear of the flange, and when thrown back over its opposite plate will form an incline for deflecting the seed.

6. The combination of hopper and feeding device consisting of casing and moving flange, said casing and flange forming a double-run device, two reversing-plates for each feeding-flange pivoted to said hopper above said flange and adapted to swing within both chambers of said double-run device, formed so that one plate may be reversed to rest upon the opposite plate, for the purpose specified.

7. The combination of hopper and feeding device consisting of a casing and moving flange, a discharge-opening for said feeding device, said casing formed at its rear edge in close proximity to said moving flange but tapering away from that point to the discharge-opening, for the purpose specified.

8. In a distributer consisting of a feeding device, a plurality of measuring-channels, a plurality of plates, each plate formed to cut off its respective measuring-channel and further adapted when reversed to assist in deflecting grain away from the opposite measuring-channel.

9. The combination of a hopper and feeding devices consisting of a casing and feeding-flange, the ends of said casing formed flush with the bottom of said hopper and adapted to fit against the said bottom, and the sides of said casing dropped below the ends of said casing and forming an open space in the side of said casing below the bottom of said hopper, an extension to said hopper adapted to form a chamber alongside said feeding-flange, the open space referred to constituting the entrance from said chamber to the feeding-flange of the feeding device, for the purpose specified.

10. The combination of the hopper and feeding device consisting of a casing and feeding-flange, the ends of said casing being formed flush with the bottom of said hopper, and the sides of said casing being dropped below the ends thereof, an extension formed to said hopper, the ends of said extension abutting against the ends of said casing, and the bottom of said extension forming with the top of the sides of said casing the bottom of a chamber formed alongside said feeding-flange.

In testimony whereof I have hereunto set my hand this 2nd day of April, A. D. 1904.

FRANK R. PACKHAM.

Witnesses:
CHAS. I. WELCH,
CLIFTON P. GRANT.